(12) United States Patent
Ishigaki et al.

(10) Patent No.: US 7,429,366 B2
(45) Date of Patent: Sep. 30, 2008

(54) CATALYST AND PROCESS FOR DECOMPOSING CARBONYL SULFIDE AND HYDROGEN CYANIDE

(75) Inventors: Shinya Ishigaki, deceased, late of Ibaraki (JP); by Satomi Ishigaki, legal representative, Ibaraki (JP); by Aya Ishigaki, legal representative, Ibaraki (JP); by Akane Ishigaki, legal representative, Ibaraki (JP); by Tatsuya Ishigaki, legal representative, Ibaraki (JP); Eiichi Hosoya, Tokyo (JP); Kazutaka Egami, Fukuoka (JP)

(73) Assignees: JGC Corporation (JP); Catalysts & Chemicals Industries Co., Ltd (JP); Sud-Chemie Catalysts Japan, Inc. (JP)

(*) Notice: Subject to any disclaimer, the term of this patent is extended or adjusted under 35 U.S.C. 154(b) by 52 days.

(21) Appl. No.: 10/494,318

(22) PCT Filed: Oct. 30, 2002

(86) PCT No.: PCT/JP02/11318

§ 371 (c)(1),
(2), (4) Date: Sep. 7, 2004

(87) PCT Pub. No.: WO03/038013

PCT Pub. Date: May 8, 2003

(65) Prior Publication Data

US 2005/0084435 A1     Apr. 21, 2005

(30) Foreign Application Priority Data

Nov. 2, 2001  (JP) ............................ 2001-338207

(51) Int. Cl.
*B01J 23/26* (2006.01)
*B01J 23/00* (2006.01)
*B01J 21/00* (2006.01)

(52) U.S. Cl. .................. 423/236; 502/256; 502/263; 502/320; 502/407; 502/415; 502/439

(58) Field of Classification Search .......... 502/256, 502/263, 320, 407, 415, 439; 423/236
See application file for complete search history.

(56) References Cited

U.S. PATENT DOCUMENTS

| 3,715,321 | A | * | 2/1973 | Horvath ................. 502/228 |
| 3,879,289 | A | * | 4/1975 | Aspinwall et al. ........ 210/90 |
| 3,923,957 | A | * | 12/1975 | Homberg et al. ......... 423/236 |
| 4,039,621 | A | * | 8/1977 | Costantini ............ 423/239.1 |

(Continued)

Primary Examiner—Cam N. Nguyen
(74) Attorney, Agent, or Firm—Andrus, Sceales, Starke & Sawall, LLP

(57) ABSTRACT

A solution of a chromium compound is impregnated into a silica-alumina carrier made of alumina and containing 1 to 5 weight % of silica relative to the weight of the carrier, thereby to obtain a decomposing catalyst carrying 10 to 15 weight % of chromium oxide relative to the weight of the catalyst in terms of $Cr_2O_3$. By contacting mixed gas obtained through partial oxidation of heavy oil and/or coal with the decomposing catalyst, COS and HCN contained in the mixed gas are decomposed/removed. In this case, transition of alumina into boehmite can be suppressed owing to coexistence of silica and chromium oxide, so that COS and HCN can be decomposed by highly active catalytic reactions over a long time.

7 Claims, 2 Drawing Sheets

U.S. PATENT DOCUMENTS

| | | | |
|---|---|---|---|
| 4,041,130 A * | 8/1977 | Mackles | 423/220 |
| RE29,771 E * | 9/1978 | Cull et al. | 502/242 |
| 4,136,156 A * | 1/1979 | Weigert | 423/372 |
| 4,301,035 A * | 11/1981 | Risse | 502/256 |
| 4,337,366 A * | 6/1982 | Fattore et al. | 568/698 |
| 4,704,137 A * | 11/1987 | Richter | 48/197 R |
| 4,769,224 A * | 9/1988 | van Grinsven et al. | 423/236 |
| 4,888,317 A * | 12/1989 | DeAngelis et al. | 502/60 |
| 5,034,364 A * | 7/1991 | Kral et al. | 502/117 |
| 5,093,300 A * | 3/1992 | Vogels et al. | 502/256 |
| 5,389,689 A * | 2/1995 | Fujimoto et al. | 518/700 |
| 5,466,427 A * | 11/1995 | Rumpf et al. | 423/210 |
| 5,576,263 A * | 11/1996 | Badley et al. | 502/237 |
| 5,595,953 A * | 1/1997 | McDaniel et al. | 502/237 |
| 5,624,877 A * | 4/1997 | Bergmeister et al. | 502/120 |
| 5,635,438 A * | 6/1997 | Cowfer et al. | 502/319 |
| 5,851,948 A * | 12/1998 | Chuang et al. | 502/314 |
| 6,267,874 B1 * | 7/2001 | Iijima et al. | 208/217 |
| 6,274,109 B1 * | 8/2001 | Matsumoto et al. | 423/236 |

* cited by examiner

| CATALYST | PREPARATION EXAMPLE | CATALYST COMPOSITION (WEIGHT%) | | | BET SPECIFIC SURFACE AREA (m²/g) | CONVERSION RATE (%) | |
|---|---|---|---|---|---|---|---|
| | | Cr₂O₃ | SiO₂ | K₂CO₃ | | COS | HCN |
| A | EXAMPLE 1 | 13.2 | 2.5 | — | 247 | 99.7 | 77 |
| B | EXAMPLE 2 | 13.5 | 2.4 | — | 262 | 99.6 | 78 |
| C | EXAMPLE 3 | 10.1 | 2.5 | — | 253 | 99.6 | 73 |
| D | EXAMPLE 4 | 13.4 | 1.2 | — | 250 | 99.8 | 76 |
| E | COMPARATIVE EXAMPLE 1 | 13.2 | — | — | 255 | 92 | 59 |
| F | COMPARATIVE EXAMPLE 2 | — | 3.0 | — | 298 | 99.8 | 11 |
| G | COMPARATIVE EXAMPLE 3 | 13.5 | — | 6.0 | 281 | 99.7 | 76 |

FIG.3

| CATALYST | PREPARATION EXAMPLE | INITIAL SPECIFIC SURFACE AREA (m²/g) | BET SPECIFIC SURFACE AREA AFTER STEAM TREATMENT (m²/g) | BET SPECIFIC SURFACE AREA REDUCTION RATE (%) | CONVERSION RATE (%) | |
|---|---|---|---|---|---|---|
| | | | | | COS | HCN |
| A | EXAMPLE 1 | 247 | 173 | 30 | 99.0 | 77 |
| B | EXAMPLE 2 | 262 | 185 | 29 | 99.3 | 77 |
| C | EXAMPLE 3 | 253 | 175 | 31 | 99.8 | 71 |
| D | EXAMPLE 4 | 250 | 143 | 43 | 97 | 74 |
| E | COMPARATIVE EXAMPLE 1 | 255 | 78 | 69 | 62 | 26 |
| F | COMPARATIVE EXAMPLE 2 | 298 | 32 | 89 | 55 | 0 |
| G | COMPARATIVE EXAMPLE 3 | 281 | 119 | 58 | 72 | 30 |

CATALYST AND PROCESS FOR DECOMPOSING CARBONYL SULFIDE AND HYDROGEN CYANIDE

TECHNICAL FIELD

The present invention relates to a catalyst for decomposing carbonyl sulfide (COS) and hydrogen cyanide (HCN) contained in mixed gas obtained by partial oxidizing heavy oil and/or coal, and further relates to a process for decomposing COS and HCN using such a catalyst.

BACKGROUND ART

In general, coal is partial oxidized in a partial oxidation furnace and resultant gas is introduced into a gas turbine to produce the electric power. It has also been considered to use heavy oil instead of coal. In the partial oxidation furnace, oxidation using a less amount of oxygen than that stoichiometrically required for complete combustion of a raw material, i.e. so-called incomplete combustion, is carried out, and the produced gas (mixed gas) contains hydrogen, carbon monoxide, steam and a little carbon dioxide, and further contains impurities such as hydrogen sulfide ($H_2S$), COS, HCN and so on.

As one of methods for removing the impurities contained in the foregoing mixed gas, a wet absorption method using methyldiethanolamine (MDEA) as an absorption solvent is known. However, although this method is effective for selectively removing $H_2S$, the rate of removal of another impurity, i.e. COS, is low, and further, HCN reacts with MDEA to form a stable compound so that MDEA is degraded. Therefore, it is necessary to remove COS and HCN in a pretreatment before implementing the wet absorption method.

In order to perform the foregoing pretreatment, it has been considered to use a catalyst for converting COS into $H_2S$ that is liable to be selectively absorbed by MDEA and for converting HCN into ammonia that is harmless to MDEA, through conversion reactions represented by reaction formulae (1) to (3) given below.

$$COS + H_2O \rightarrow CO_2 + H_2S \quad (1)$$

$$HCN + H_2O \rightarrow NH_3 + CO \quad (2)$$

$$HCN + 3H_2 \rightarrow NH_3 + CH_4 \quad (3)$$

As the foregoing catalyst, an alumina catalyst carrying Group VI metal and barium reported in JP-A-2000-51694 or an alkalized chromium oxide-alumina catalyst carrying alkali metal and chromium oxide reported in JP-A-2000-86211 is known, for example.

When converting COS and HCN in the mixed gas using the foregoing catalyst, there arise the following problems. As carriers of alumina catalysts, γ-alumina ($Al_2O_3$) having a relatively high activity is used, for example. However, γ-alumina phase can change into boehmite (AlOOH) in the presence of steam at a high partial pressure with, for example, a temperature of the mixed gas being 180° C. and a steam partial pressure being 0.4 MPa. This would lower the activity of the catalyst due to the reduction of the BET specific surface area effective for the activity of the catalyst.

If the activity of the catalyst is reduced as noted above, the mixed gas with a high concentration of COS and HCN is sent to an absorber that implements removal of $H_2S$, so that, as described above, the absorption solvent is degraded to lower the rate of removal of $H_2S$. Further, in case of producing the electric power by means of a gas turbine that uses the mixed gas as fuel, there is concern about emitting sulfur oxides (SOx) and nitrogen oxides (NOx) being acid gas into the air.

Even in case of the alkalized chromium oxide-alumina catalyst, lowering of the activity of the catalyst due to phase transition of alumina into boehmite is recognized when the catalyst is used over a long term, and further, it is confirmed that potassium is scattered from the catalyst with a lapse of time. Therefore, it is necessary to use an expensive material such as an alloy 825 or 625 for preventing alkali corrosion, as a material of an apparatus such as a cooler that is provided downstream of a reaction apparatus using the catalyst, so that there is concern about increase in cost of initial investment and maintenance.

The present invention has been made under these circumstances and has the object to providing a means for decomposing/removing COS and HCN contained in mixed gas produced by partial oxidation, using a catalyst that is excellent in steam-resistant property and highly active for converting COS and HCN.

DISCLOSURE OF THE INVENTION

For accomplishing the foregoing object, according to one aspect of the present invention, there is provided a catalyst for decomposing COS and HCN contained in mixed gas through contact with the mixed gas, the mixed gas obtained by partial oxidizing heavy oil and/or coal, wherein the catalyst comprises a carrier made of alumina and containing silica, and the carrier carries chromium oxide.

With this arrangement, since the alumina carrier containing silica carries chromium oxide, transition of alumina into boehmite can be suppressed to improve a steam-resistant property, so that a high catalyst activity relative to COS and HCN can be maintained over a long time. As a result, when removing $H_2S$ contained in the mixed gas, degradation of an absorption liquid (solvent) can be suppressed. Further, if the mixed gas is supplied to a gas turbine, acid gas emitted into the air can be reduced.

It may be arranged that the content of silica falls within a range of, for example, 1 to 5 weight % relative to the weight of the carrier.

It may be arranged that the content of chromium oxide falls within a range of, for example, 10 to 15 weight % relative to the weight of the catalyst in terms of $Cr_2O_3$.

Preferably, the BET specific surface area of the catalyst is 200 $m^2/g$ or greater.

According to another aspect of the present invention, there is provided a process comprising contacting the foregoing catalyst with mixed gas obtained by partial oxidizing heavy oil and/or coal, thereby to decompose COS and HCN contained in the mixed gas.

BRIEF DESCRIPTION OF THE DRAWINGS

FIG. 3 is another characteristic diagram showing the results of examples carried out for confirming the effect of the present invention.

BEST MODE FOR EMBODYING THE INVENTION

Figures 1, 2:
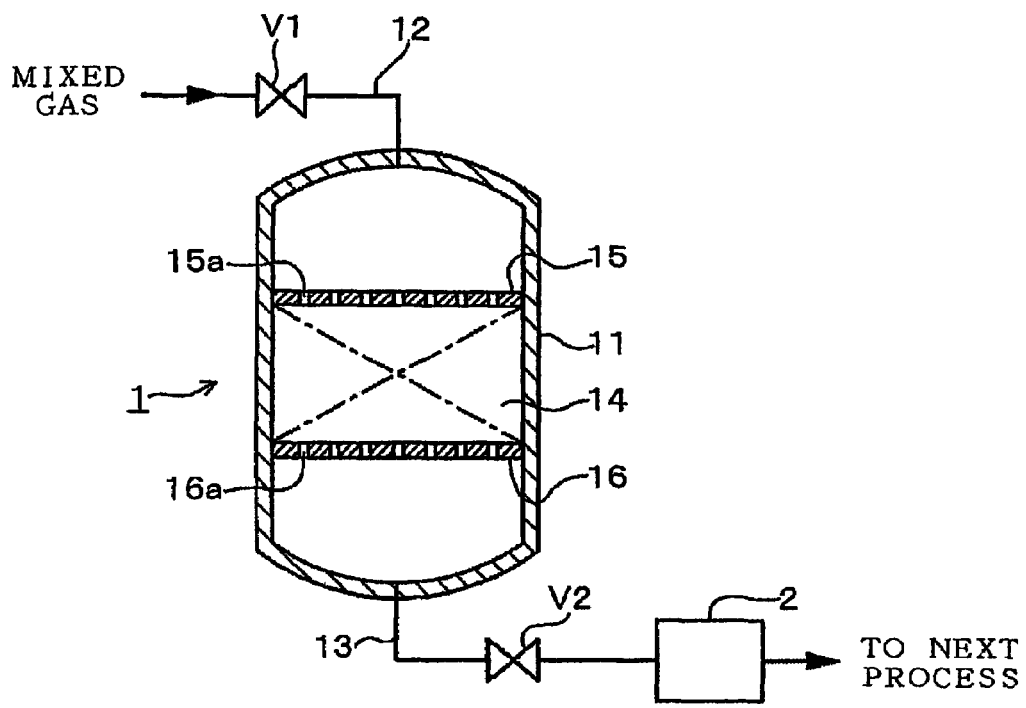
FIG. 1 is an explanatory diagram for explaining a preferred embodiment of the present invention.
FIG. 2 is a characteristic diagram showing the results of examples carried out for confirming the effect of the present invention.

Now, a preferred embodiment of a decomposing catalyst for COS and HCN according to the present invention will be described.

As a carrier of this decomposing catalyst, a carrier made of alumina ($Al_2O_3$) and containing silica ($SiO_2$) (hereinafter, this carrier will be referred to as "silica-alumina carrier") is used. Silica itself is inactive. Accordingly, if the content of silica increases too much, active sites of alumina are reduced so that the conversion activity to COS and HCN is lowered. In case of producing the silica-alumina carrier by extrusion molding, if the silica content is large, the moldability of the carrier is deteriorated, while, if the silica content is small, phase transition of alumina into boehmite is advanced. Accordingly, it is desirable that the content rate of silica relative to alumina falls within a range of 1 to 5 weight %. In order to ensure the high conversion activity to COS and HCN, it is desirable that the BET specific surface area of the silica-alumina carrier is 200 ($m^2/g$) or greater. Such a silica-alumina carrier is produced by, for example, adding a silica component such as a silic acid liquid or silica sol into a soluble aluminum salt aqueous solution for neutralization to obtain a gel-state substance, heating and maturing the gel-state substance to obtain a slurry, spraying and drying the slurry to obtain powder, then adding water to the powder to implement extrusion molding. Preferably, for example, JNC-0 or JNC-1 (product name) produced by Catalysts and Chemicals Industries Co., Ltd. is used as the silica-alumina carrier. As alumina for the carrier, various types of alumina may be used, but preferably, γ-type or η-type is used.

The silica-alumina carrier carries chromium oxide. In order to make the carrier carry chromium oxide, an aqueous solution of at least one of ammonium dichromate and chromic anhydride, for example, is impregnated into the carrier. Thereafter, the carrier is dried at a temperature of 110 to 160° C. in an atmosphere of nitrogen or air, then calcined at a temperature of 400 to 600° C. in air to oxidize chromium on the surface of the carrier, so that a decomposing catalyst in the form of the silica-alumina carrier carrying chromium oxide is obtained. In this event, as will be clear from later-described examples, the BET specific surface area in the decomposing catalyst is preferably 200 ($m^2/g$) or greater, more preferably within a range of 220 to 270 ($m^2/g$). If this BET specific surface area is less than 200 ($m^2/g$), it is possible that a desired catalyst activity can not be obtained.

The present inventors know that chromium oxide carried by the silica-alumina carrier exists on the surface of the carrier as complex oxide compounds. This chromium oxide exhibits a high catalyst conversion activity against COS and HCN. However, as will be seen from the later-described examples, its conversion activity is low when silica is not contained. Accordingly, it is presumed that the conversion activity becomes effective owing to coexistence of silica that should be inactive and chromium oxide. As a result, if the carrying amount of chromium oxide is small, the sufficient effect is not obtained, while, if the carrying amount thereof is too large, catalyst active sites of alumina are reduced, and moreover, excessive chromium oxide is further carried on chromium oxide existing on the surface of the carrier, hence leading to a possibility of increase in cost. In view of this, it is desirable to carry chromium oxide within a range of 10 to 15 weight % relative to the total weight of the catalyst, calculated in terms of $Cr_2O_3$.

The catalyst may have any shape such as a spherical shape, a tablet shape, a Raschig ring shape, a cylindrical shape or a honeycomb shape, but it is desirable that an equivalent diameter (a length 6 times a ratio between geometrical volume and surface area) thereof is set to be no less than 1 mm and no greater than 6 mm.

One example of a decomposing apparatus using the foregoing catalyst will be described with reference to FIG. 1. Numeral 1 denotes a decomposing apparatus in the form of, for example, a fixed bed flow type apparatus. The decomposing apparatus 1 comprises a reactor 11 having a top portion to which a gas feed conduit 12 is connected via a valve V1 and a bottom portion to which a gas discharge conduit 13 is connected via a valve V2. In the reactor 11 is formed a catalyst layer 14 filled with the catalyst of the present invention. The catalyst layer 14 is supported by catalyst supports 15 and 16 at upper and lower sides thereof, respectively. The catalyst supports 15 and 16 are formed with a number of gas flow holes 15a and 16a, respectively, such that the mixed gas is allowed to pass through the catalyst layer 14 uniformly in a dispersed fashion. Each of the gas flow holes 15a and 16a is of a size that is large enough to allow the flow of the mixed gas therethrough and small enough to inhibit the catalyst to pass therethrough. Further, a cooler 2 is connected to the gas discharge conduit 13 for cooling the mixed gas processed by the decomposing apparatus 1. Here, a partial oxidation treatment implemented in a prior stage of the decomposing apparatus 1 will be briefly explained. In this treatment, heavy oil, less amount of oxygen than that stoichiometrically required for complete combustion of heavy oil, and high pressure steam are reacted together thereby to cause the so-called incomplete combustion, so that carbon monoxide, hydrogen, steam and a little carbon dioxide are produced while oxygen is all consumed. This mixed gas contains $H_2S$, COS and HCN.

In order to perform conversion, by catalytic reactions, of COS and HCN contained in the mixed gas obtained by partial oxidizing heavy oil and/or coal, the mixed gas set to a predetermined condition is introduced into the reactor 11, wherein, for example, a gas hourly space velocity is set to 900 to 20000 $h^{-1}$, a gas pressure is set so as to provide an internal pressure of, for example, atmospheric pressure to 8 MPa in the reactor 11, and a gas temperature is set to, for example, 110 to 250° C. that is higher than a dew point of the mixed gas so as to prevent condensation of steam in the mixed gas. The mixed gas uniformly contacts the filled catalyst via the gas flow holes 15a and 16a, so that COS and HCN are converted through the reactions represented by the foregoing formulae (1) to (3), and then flows out to the outlet of the reactor 11 via the gas discharge conduit 13. The effluent gas is cooled by the cooler 2, then sent to a hydrogen sulfide removing apparatus provided in the next process and further supplied to a combustion section of a gas turbine for producing the electric power. Here, the gas hourly space velocity represents a space velocity (SV) derived by (mixed gas flow rate ($m^3/h$)/volume ($m^3$) of the catalyst filled in the reactor).

According to the foregoing process configuration, by contacting COS and HCN contained as impurities in the mixed gas obtained by partial oxidation, with the foregoing catalyst, COS is converted to $H_2S$ and $CO_2$, and HCN is converted to $NH_3$, CO and $CH_4$, and further, a side reaction of COS recombination represented by a formula (4) below, which tends to be accelerated in the coexistence of CO and $H_2S$, is reduced. Further, by making the alumina carrier contain silica, the steam-resistant property is improved and the phase transition into boehmite is suppressed. Accordingly, as will be clear from the later-described examples, COS and HCN in the mixed gas can be decomposed/removed at high conversion rates by the catalytic reactions whose activities are maintained high even in a long-term use.

$$CO + H_2S \rightarrow COS + H_2 \qquad (4)$$

EXAMPLES

Now, the examples carried out for confirming the effect of the present invention will be described.

Example 1

In this example, a catalyst of the present invention was prepared using chromic anhydride as a chromium source. As a silica-alumina carrier, JNC-1 of Catalysts and Chemicals Industries Co., Ltd. obtained by extrusion-molding γ-alumina containing 3 weight % of silica relative to the weight of the carrier into a cylindrical shape having a diameter of 3 mm and a mean length of 8 mm, was used. The BET specific surface area of this carrier was 298 m$^2$/g, and the water absorption rate thereof was 0.78 cc/g. First, 100 g of the carrier was measured and put into a 500 cc beaker. Then, 21 g of chromic anhydride was dissolved in 78 cc pure water at room temperature to prepare an impregnation liquid, and the impregnation liquid was gradually dripped into the beaker using a burette while shaking the beaker with the carrier therein. Thereafter, the mixture of the carrier and the impregnation liquid was dried for 4 hours at 120° C., then calcined for 5 hours in air at 500° C. A catalyst thus obtained contained, relative to the total weight of the catalyst, 13.2 weight % of chromium oxide in terms of $Cr_2O_3$, and 2.5 weight % of silica, and the BET specific surface area thereof was 247 m$^2$/g. This catalyst was identified as Catalyst A.

Example 2

In this example, a catalyst of the present invention was prepared using ammonium dichromate as a chromium source. First, 100 g of the same carrier as that in Example 1 was measured and put into a 500 cc beaker. Then, 26 g of ammonium dichromate was dissolved in 78 cc pure water at 60° C. to prepare an impregnation liquid, and the impregnation liquid was gradually dripped into the beaker using a burette while shaking the beaker with the carrier therein. Thereafter, drying and calcination were carried out in the same manner as that in Example 1. A catalyst thus obtained contained, relative to the total weight of the catalyst, 13.5 weight % of chromium oxide in terms of $Cr_2O_3$, and 2.4 weight % of silica, and the BET specific surface area thereof was 262 m$^2$/g. This catalyst was identified as Catalyst B.

Example 3

In this example, a catalyst of the present invention was prepared by changing a chromium concentration as compared with Example 1. First, 100 g of the same carrier as that in Example 1 was measured and put into a 500 cc beaker. Then, 15 g of chromic anhydride was dissolved in 78 cc pure water at room temperature to prepare an impregnation liquid, and the impregnation liquid was gradually dripped into the beaker using a burette while shaking the beaker with the carrier therein. Thereafter, drying and calcination were carried out in the same manner as that in Example 1. A catalyst thus obtained contained, relative to the total weight of the catalyst, 10.1 weight % of chromium oxide in terms of $Cr_2O_3$, and 2.5 weight % of silica, and the BET specific surface area thereof was 253 m$^2$/g. This catalyst was identified as Catalyst C.

Example 4

In this example, as a carrier of a catalyst of the present invention, a silica-alumina carrier with the content of silica being 1.4 weight % was used. Specifically, as the carrier, JNC-0 of Catalysts and Chemicals Industries Co., Ltd. obtained by extrusion-molding γ-alumina containing 1.4 weight % of silica relative to the weight of the carrier into a cylindrical shape having a diameter of 3 mm and a mean length of 8 mm, was used. The BET specific surface area of this carrier was 287 m$^2$/g, and the water absorption rate thereof was 0.73 cc/g. First, 100 g of the silica-alumina carrier was measured and put into a 500 cc beaker. Then, 21 g of chromic anhydride was dissolved in 73 cc pure water at room temperature to prepare an impregnation liquid, and the impregnation liquid was gradually dripped into the beaker using a burette while shaking the beaker with the carrier therein. Thereafter, drying and calcination were carried out in the same manner as that in Example 1. A catalyst thus obtained contained, relative to the total weight of the catalyst, 13.4 weight % of chromium oxide in terms of $Cr_2O_3$, and 1.2 weight % of silica, and the BET specific surface area thereof was 250 m$^2$/g. This catalyst was identified as Catalyst D.

COMPARATIVE EXAMPLE 1

In this example, a catalyst was prepared wherein an alumina carrier having approximately the same BET specific surface area as those in the foregoing examples but containing no silica carried chromium oxide. As the alumina carrier, JNX-1 of Catalysts and Chemicals Industries Co., Ltd. obtained by extrusion-molding y-alumina into a cylindrical shape having a diameter of 3 mm and a mean length of 8 mm, was used. The BET specific surface area of this carrier was 300 m$^2$/g, and the water absorption rate thereof was 0.70 cc/g. First, 100 g of the alumina carrier was measured and put into a 500 cc beaker. Then, 23 g of chromic anhydride was dissolved in 70 cc pure water at room temperature to prepare an impregnation liquid, and the impregnation liquid was gradually dripped into the beaker using a burette while shaking the beaker with the carrier therein. Thereafter, drying and calcination were carried out in the same manner as that in Example 1. A catalyst thus obtained contained, relative to the total weight of the catalyst, 13.2 weight % of chromium oxide in terms of $Cr_2O_3$, and the BET specific surface area thereof was 255 m$^2$/g. This catalyst was identified as Catalyst E.

COMPARATIVE EXAMPLE 2

In this example, as a catalyst composed only of a silica-alumina carrier having approximately the same BET specific surface area as those in the foregoing examples but carrying no chromium oxide, JNC-1 was used as it is and identified as Catalyst F.

COMPARATIVE EXAMPLE 3

In this example, an alkalized chromium oxide-alumina catalyst was prepared based on an alumina carrier having approximately the same BET specific surface area as those in the foregoing examples but containing no silica, according to the technique described in JP-A-2000-86211. Specifically, using the same carrier as that in Comparative Example 1 as the alumina carrier, an alkalized chromium oxide-alumina catalyst carrying potassium was prepared according to the technique described in JP-A-2000-86211. The catalyst thus obtained contained, relative to the total weight of the catalyst, 13.5 weight % of chromium oxide in terms of $Cr_2O_3$, and 6.0 weight % of potassium compounds in terms of $K_2CO_3$, and the BET specific surface area thereof was 281 m$^2$/g. This catalyst was identified as Catalyst G.

(Test 1)

Decomposing activities of Catalysts A to G obtained in Examples 1 to 4 and Comparative Examples 1 to 3 with respect to COS and HCN were measured using a high pressure fixed bed flow type reactor. Feed gas adjusted to have a composition of hydrogen: 39 volume %, CO: 42 volume %, $H_2S$: 1 volume %, COS: 600 volume ppm, HCN: 50 volume ppm, water (steam): 12 volume %; and nitrogen: 6 volume % was contacted with Catalysts A to F filled in the high pressure fixed bed flow type reactor, respectively, under conditions of a gas hourly space velocity of 10000 h⁻¹, a pressure of 3.6 MPa and an inlet temperature of 180° C. Thereafter, when the steady state was accomplished, COS and HCN in the gas at inlet and outlet of the reactor were analyzed to determine the conversion rates.

Here, the conversion rates represent rates of COS and HCN converted in the reactor, and can be derived respectively from expressions of ((COS concentration at reactor inlet−COS concentration at reactor outlet)/(COS concentration at reactor inlet))×100 and ((HCN concentration at reactor inlet−HCN concentration at reactor outlet)/(HCN concentration at reactor inlet))×100.

(Result of Test 1 and Consideration)

The results are shown in FIG. 2. FIG. 2 shows catalyst compositions of the respective catalysts as characteristics thereof, BET specific surface areas thereof, and conversion rates of COS and HCN after the foregoing feed gas was contacted with the catalysts for 24 hours. From the comparison of Catalysts A to D with Catalysts E and F, it is understood that the conversion rates of COS and HCN can be enhanced by containing silica and chromium oxide, while, if one of silica and chromium oxide is omitted, the high activity rates can not be achieved. As compared with Catalysts A, B and D, the conversion rate of HCN of Catalyst C containing 10.1 weight % of chromium oxide is slightly lower than those of Catalysts A, B and D, but significantly higher than those of Catalysts E and F of the comparative examples. Therefore, it can be seen that if chromium oxide is contained at 10 weight % or more, the high conversion rates can be achieved with respect to COS and HCN. Further, it is confirmed that the conversion activity does not depend so much on the content of silica because there is no difference in conversion rate between those cases where the contents of silica are 1.2 weight % and 2.5 weight %. Further, from this result, it is seen that if the content of silica is 1 weight % or greater relative to the weight of the carrier (the content of silica relative to the carrier is about 1.4 weight % in Catalyst D), the high conversion activity can be obtained. It is further confirmed that since Catalysts A and B exhibit substantially the same conversion rates, the same result can be obtained if either of chromic anhydride and ammonium dichromate is used to obtain chromium oxide. On the other hand, when comparing Catalysts A to D with Catalyst G, it is seen that they exhibit substantially the same conversion activities. However, Catalysts A to D do not contain potassium, so that the problem of alkali corrosion does not arise.

(Test 2)

For examining the catalyst activity when oxygen existed in feed gas, the feed gas having the same composition as that in Test 1 except for containing nitrogen: 5 volume %, and oxygen: 1 volume % was contacted with Catalyst B filled in a high pressure fixed bed flow type reactor, under conditions of a gas hourly space velocity of 4000 h⁻¹, a pressure of 2.9 MPa and an inlet gas temperature of 200° C.

(Result of Test 2 and Consideration)

The conversion rates of COS and HCN were 99.3% and 98%, respectively, immediately after the start of reactions. Then, it was confirmed that the conversion rates were gradually lowered, and after 100 hours from the start of reactions, the conversion rates of COS and HCN were lowered to 82% and 55%, respectively. Catalyst B having been used was taken out and the content of sulfur was measured. As a result, sulfur was contained at 38 weight %. It is considered that Claus reactions represented by formulae (5) to (7) below, for example, took place to deposit single sulfur in the coexistence of oxygen and H₂S, and the elementary sulfur was accumulated in pores of the catalyst to lower the catalyst activity.

$$H_2S + 1.5O_2 \rightarrow SO_2 + H_2O \quad (5)$$

$$COS + 1.5O_2 \rightarrow SO_2 + CO_2 \quad (6)$$

$$SO_2 + 2H_2S \rightarrow (3/8)S_8 + 2H_2O \quad (7)$$

(Test 3)

Steam-resistant properties of Catalysts A to G obtained in Examples 1 to 4 and Comparative Examples 1 to 3 were measured using a high pressure fixed bed flow type reactor. Feed gas adjusted to have a composition of water (steam): 11.6 volume %, and nitrogen: 88.4 volume % was contacted with. Catalysts A to G under conditions of a gas hourly space velocity of 5000 h⁻¹, a pressure of 3.6 MPa and an inlet temperature of 180° C. After the continuous treatment for 5900 hours, the BET specific surface areas of the respective catalysts were measured. Further, according to the same condition and method as those in Test 1, the conversion rates of COS and HCN were measured with respect to the respective catalysts after the steam treatment.

(Result of Test 3 and Consideration)

The results are shown in FIG. 3. FIG. 3 shows initial BET specific surface areas of the prepared respective catalysts, BET specific surface areas thereof after the steam treatment, BET specific surface area reduction rates derived from those results, and conversion rates of COS and HCN. As compared with Catalysts E and G of the comparative examples containing no silica and Catalyst F of the comparative example containing no chromium oxide, the BET specific surface area reduction rates of Catalysts A to D of the examples were smaller. Accordingly, it was confirmed that the transition of alumina into boehmite was suppressed by containing silica and chromium oxide. Specifically, it was confirmed that the steam-resistant properties of the catalysts were improved. With respect to the catalyst activities represented by the conversion rates of COS and HCN after such a long time steam treatment, as is clear from comparison between the results of Test 1 shown in FIG. 2 and the results of Test 3 conducted in the same manner as that in Test 1 after implementing the steam treatment, the conversion rates of COS and HCN were extremely lowered with respect to Catalysts E, F and G of the comparative examples whose BET specific surface area reduction rates were large due to the steam treatment. On the other hand, with respect to Catalysts A to D of the examples, although lowering of the conversion rates was observed, the degree of such lowering was quite small. Specifically, it was confirmed that the catalyst activities were maintained even after the long time steam treatment.

INDUSTRIAL APPLICABILITY

As described above, by contacting the mixed gas obtained through partial oxidation of heavy oil and/or coal, with the decomposing catalyst in which the carrier made of alumina and containing silica carries chromium oxide, COS and HCN contained in the mixed gas can be decomposed/removed while maintaining the high catalyst activity over a long time.

The invention claimed is:

1. A process for decomposing carbonyl sulfide and hydrogen cyanide contained in a mixed gas obtained by partially oxidizing heavy oil or coal, the mixed gas consisting essentially of hydrogen, carbon monoxide, steam and carbon dioxide and also containing impurities comprising hydrogen sulfide, carbonyl sulfide and hydrogen cyanide, which process comprises:

contacting the mixed gas with a catalyst which comprises:
(a) a carrier made of alumina and containing silica, and
(b) chromium oxide carried by the carrier, thereby converting carbonyl sulfide and carbon dioxide according to the formula:

$$COS + H_2O \rightarrow CO_2 + H_2S \qquad (1)$$

and converting hydrogen cyanide to ammonia, carbon monoxide and methane according to the following formulae:

$$HCN + H_2O \rightarrow NH_3 + CO \qquad (2)$$

and $$HCN + 3H_2 \rightarrow NH_3 + CH_4 \qquad (3)$$

wherein chromium oxide is contained in an amount of 10 to 15 weight % in terms of $Cr_2O_3$ relative to the catalyst and the catalyst has a BET specific surface area of 200 m$^2$/g or greater, wherein the mixed gas has a temperature which is higher than a dew point of the mixed gas and is within the range of from 110 to 250° C., and wherein, in the catalyst, chromium oxide is carried on a surface of the carrier as a complex oxide compound.

2. The process according to claim 1, which further comprises:

subjecting the mixed gas which has been contacted with the catalyst, to an absorber for removing hydrogen sulfide from the mixed gas.

3. The process according to claim 1, wherein the mixed gas has a pressure of from atmospheric pressure to 8 MPa and is contacted with the catalyst at a gas hourly space velocity of 900 to 20,000 h$^{-1}$.

4. The process according to claim 1, wherein, in the catalyst, silica is contained in an amount of 1 to 5 weight % relative to the carrier.

5. The process according to claim 1, wherein the BET specific surface area of the catalyst is 220 to 270 m$^2$/g.

6. The process according to claim 1, wherein the catalyst has an equivalent diameter of 1 mm to 6 mm.

7. The process according to claim 1, wherein the alumina in the catalyst is γ-type or η-type.

* * * * *